(12) United States Patent
Zhou et al.

(10) Patent No.: US 10,800,262 B2
(45) Date of Patent: Oct. 13, 2020

(54) METHODS AND SYSTEMS FOR CONTROLLING A DC BUS VOLTAGE FROM A THREE-PHASE VOLTAGE SOURCE

(71) Applicant: Deere & Company, Moline, IL (US)

(72) Inventors: Guozhen Zhou, Fargo, ND (US); Sumit Dutta, Fargo, ND (US); Long Wu, Fargo, ND (US); Danielle Li, Fargo, ND (US); Scott C. Johnson, Fargo, ND (US)

(73) Assignee: Deere & Company, Moline, IL (US)

( * ) Notice: Subject to any disclaimer, the term of this patent is extended or adjusted under 35 U.S.C. 154(b) by 69 days.

(21) Appl. No.: 15/983,582

(22) Filed: May 18, 2018

(65) Prior Publication Data

US 2019/0351770 A1 Nov. 21, 2019

(51) Int. Cl.
| | | |
|---|---|---|
| *B60L 3/00* | (2019.01) | |
| *H02P 21/22* | (2016.01) | |
| *B60L 15/20* | (2006.01) | |
| *H02P 21/00* | (2016.01) | |
| *H02P 27/08* | (2006.01) | |

(52) U.S. Cl.
CPC ......... *B60L 3/0061* (2013.01); *B60L 15/2045* (2013.01); *H02P 21/0003* (2013.01); *H02P 21/22* (2016.02); *H02P 27/08* (2013.01); *B60L 2210/30* (2013.01); *B60L 2240/429* (2013.01)

(58) Field of Classification Search
CPC .. H02P 21/22; H02P 27/08; B60L 9/04; B60L 15/04; B60L 50/11
See application file for complete search history.

(56) References Cited

U.S. PATENT DOCUMENTS

| | | | |
|---|---|---|---|
| 8,880,250 B2 | 11/2014 | Wu et al. | |
| 9,475,403 B2 | 10/2016 | Wu et al. | |
| 2007/0108771 A1 | 5/2007 | Jones et al. | |
| 2008/0303459 A1* | 12/2008 | Furukawa | B60K 6/46 318/142 |
| 2013/0181654 A1* | 7/2013 | Rozman | H02M 5/4585 318/721 |

(Continued)

OTHER PUBLICATIONS

F. Briz et al., "Dynamic Analysis of Current Regulators for AC Motors Using Complex Vectors", Industry Applications Conference, 1998. Thirty-Third IAS Annual Meeting.

(Continued)

*Primary Examiner* — Bickey Dhakal
*Assistant Examiner* — Said Bouziane
(74) *Attorney, Agent, or Firm* — Harness, Dickey & Pierce, P.L.C.

(57) ABSTRACT

In an example embodiment, a method of controlling a three-phase alternating current (AC) voltage source includes determining an error between a direct current (DC) bus voltage command and a detected DC bus voltage, the detected DC bus voltage being a part of an outer feedback loop, obtaining one of a virtual conductance or virtual resistance, the one of the virtual conductance or the virtual resistance being a part of an inner feedback loop relative to the outer feedback loop, regulate an output DC bus voltage based on the error and the one of the virtual conductance or the virtual resistance and controlling the three-phase AC voltage source based on the regulation of the output DC bus voltage.

12 Claims, 8 Drawing Sheets

(56) References Cited

U.S. PATENT DOCUMENTS

| | | | | |
|---|---|---|---|---|
| 2014/0306640 A1* | 10/2014 | Yamamoto | .............. | H02P 27/08 |
| | | | | 318/504 |
| 2015/0057868 A1* | 2/2015 | Wu | .............. | B60L 15/20 |
| | | | | 701/22 |
| 2015/0183385 A1* | 7/2015 | Iwashima | .............. | B60R 16/03 |
| | | | | 307/9.1 |
| 2016/0049895 A1* | 2/2016 | Niwa | .............. | H02P 27/08 |
| | | | | 318/400.3 |
| 2018/0362181 A1* | 12/2018 | Iwashima | .............. | B64D 41/00 |

OTHER PUBLICATIONS

Xiongfei Wang et al., "Virtual-Impedance-Based Control for Voltage-Source and Current-Source Converters", IEEE Transactions on Power Electronics (vol. 30, Issue: 12, Dec. 2015).

Vladimir Blasko et al., "A Novel Control to Actively Damp Resonance in Input LC Filter of a Three-Phase Voltage Source Converter", IEEE Transactions on Industry Applications (vol. 33, Issue: 2, Mar./Apr. 1997).

Hyunbae Kim et al., "A Vitrual Translation Technique to Improve Current Regulator for Salient-Pole AC Machines", Power Electronics Specialists Conference, 2004. PESC 04.

Amr Ahmed A. Radwan et al, Linear Active Stabilization of Converter-Dominated DC Microgrids, IEEE Transactions on Smart Grid, Mar. 2012, pp. 203-216, vol. 3. No. 1.

European Search Report issued in counterpart application No. 19175216.1 dated Sep. 24, 2019. (8 pages).

\* cited by examiner

METHODS AND SYSTEMS FOR CONTROLLING A DC BUS VOLTAGE FROM A THREE-PHASE VOLTAGE SOURCE

FIELD

Example embodiments are related to systems and methods for controlling DC bus voltage in a system.

BACKGROUND

Vehicles (e.g., automobiles, tractors and excavators) often include electrical applications (e.g., electric drives). A DC bus voltage may be regulated by controlling a generator. The established DC bus voltage may then provide electric power to many motoring applications on the vehicle.

SUMMARY

At least one example embodiment provides a method of controlling a three-phase alternating current (AC) voltage source. The method includes determining an error between a direct current (DC) bus voltage command and a detected DC bus voltage, the detected DC bus voltage being a part of an outer feedback loop, obtaining one of a virtual conductance or a virtual resistance, the one of the virtual conductance or the virtual resistance being a part of an inner feedback loop relative to the outer feedback loop, regulating an output DC bus voltage based on the error and the one of the virtual conductance or the virtual resistance and controlling the three-phase voltage source based on the regulation of the output DC bus voltage.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

FIG. 1 is a block diagram of a system for controlling an electrical system, according to an example embodiment;

FIG. 2 illustrates a control block diagram of the system in FIG. 1, according to an example embodiment;

FIG. 5 is a block diagram of an electronic data processing system consistent with a processing system shown in FIG. 1, according to an example embodiment; and FIG. 6 illustrates a method of controlling an electric machine, according to an example embodiment.

DETAILED DESCRIPTION

Figure 1:
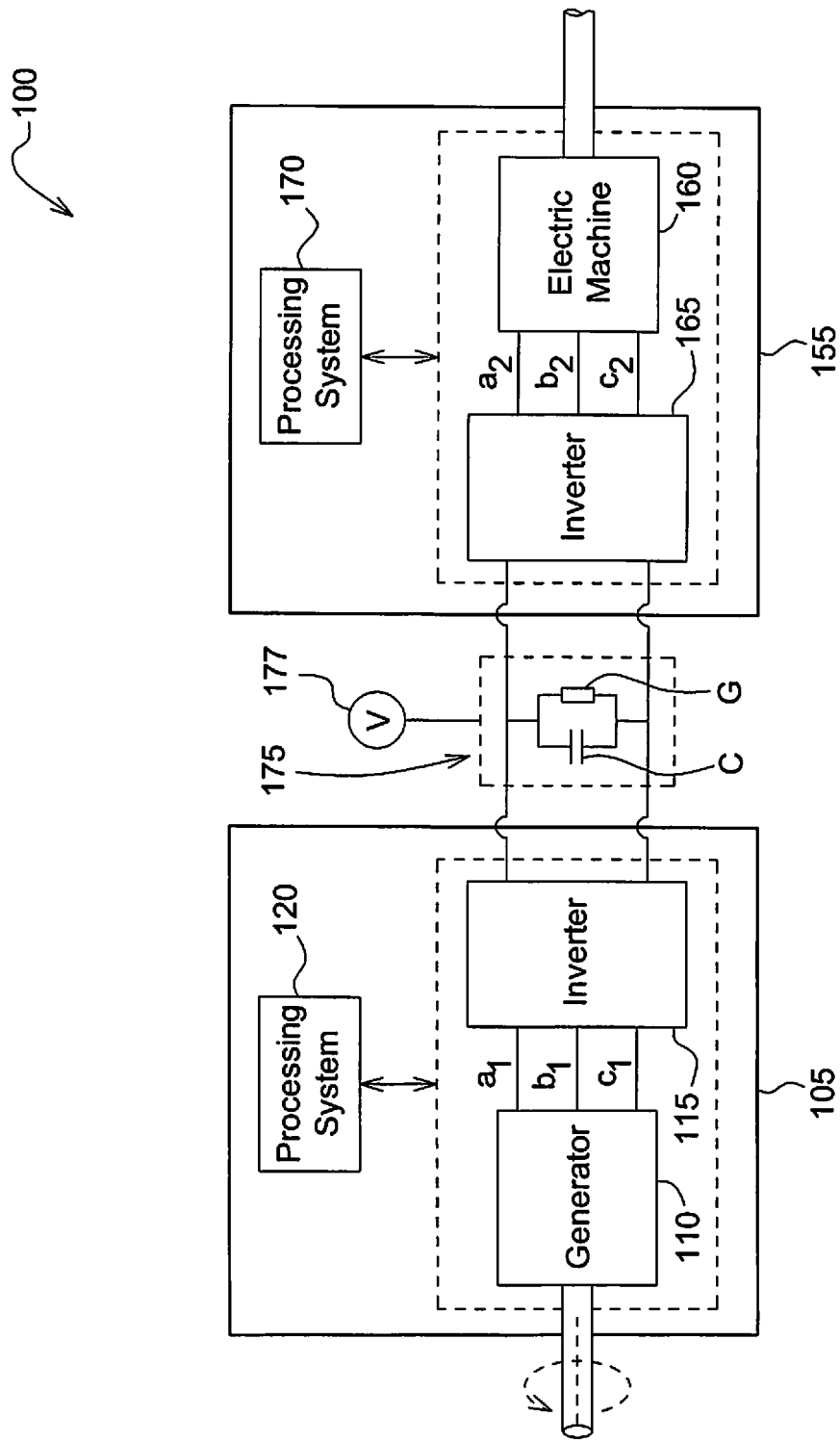

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), Digital Signal Processors (DSPs), Application-Specific-Integrated-Circuits (ASICs), Field Programmable Gate Arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The terms memory and is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with memory device.

In three-phase alternating current (AC) voltage systems, DC bus voltage oscillations are amplified when the DC bus capacitance is reduced. This could have several negative effects. For example, power quality issues may arise since other components may be powered from the DC bus in a hybrid electric vehicle. In addition, the lifetime of the DC bus capacitor may be decreased, and the operating range of the machines may become limited.

In the description below, the q-d axis current or voltage refers to the direct axis current or voltage and the quadrature axis current or voltage as applicable in the context of vector-controlled alternating current machines. Moreover, while the term command is used below, it should be understood that command refers to a target value.

At least one example embodiment provides a method of controlling a three-phase alternating current (AC) voltage source. The method includes determining an error between a direct current (DC) bus voltage command and a detected DC bus voltage, the detected DC bus voltage being a part of an outer feedback loop, obtaining one of a virtual conductance or a virtual resistance, the one of the virtual conductance or the virtual resistance being a part of an inner feedback loop relative to the outer feedback loop, regulating an output DC bus voltage based on the error and the one of the virtual conductance or the virtual resistance and controlling the three-phase voltage source based on the regulation of the output DC bus voltage.

In at least one example embodiment, the method further includes generating a first parameter based on a proportional integral (PI) function and the error, wherein the controlling controls the three-phase AC voltage source based on the first parameter.

In at least one example embodiment, the generating the first parameter includes determining a current value based on the error, determining whether the current value is within a first saturation limit and a second saturation limit and generating the first parameter based on whether the current value is within a first saturation limit and a second saturation limit. In at least one example embodiment, the determining the current value includes selecting one of a limited current value and a reset value based on an operating mode of the three-phase AC voltage source and determining the current value based on the selecting.

In at least one example embodiment, the method further includes determining a second parameter based on the one of the virtual conductance or the virtual resistance and the detected DC bus voltage, wherein the controlling controls the three-phase AC voltage source based on the second parameter.

In at least one example embodiment, the method further includes generating a charging current command based on the first parameter and the second parameter.

In at least one example embodiment, the method further includes generating a first power command based on the charging current command, generating a second power command based on the first power command and a feed-forward power, determining whether the second power command is within a first saturation limit and a second saturation limit and generating a torque command based on whether the second power command is within the first saturation limit and the second saturation limit.

In at least one example embodiment, the charging current command is a difference between the first parameter and the second parameter.

In at least one example embodiment, the method further includes determining a first set of gains based on a regulator bandwidth, the first set of gains being part of the PI function.

In at least one example embodiment, the method further includes determining the one of the virtual conductance or the virtual resistance based on the first set of gains.

At least one example embodiment provides a machine drive including a three-phase alternating current (AC) voltage source configured to regulate an output DC bus voltage based on an error and one of the virtual conductance or the virtual resistance, the error being between a direct current (DC) bus voltage command and a detected DC bus voltage, the detected DC bus voltage being a part of an outer feedback loop, a memory storing computer readable instructions and at least one processor configured to execute the computer readable instructions to cause the machine drive to determine the error, obtain the one of the virtual conductance or the virtual resistance, the one of the virtual conductance or the virtual resistance being a part of an inner feedback loop relative to the outer feedback loop and control the three-phase AC voltage source based on the regulation of the output DC bus voltage.

In at least one example embodiment, the at least one processor is configured to execute the computer readable instructions to cause the machine drive to generate a first parameter based on a proportional integral (PI) function and the error, wherein the controlling controls the three-phase AC voltage source based on the first parameter.

In at least one example embodiment, the at least one processor is configured to execute the computer readable instructions to cause the machine drive to determine a current value based on the error, determine whether the current value is within a first saturation limit and a second saturation limit and generate the first parameter based on whether the current value is within a first saturation limit and a second saturation limit.

In at least one example embodiment, the at least one processor is configured to execute the computer readable instructions to cause the machine drive to select one of a limited current value and a reset value based on an operating mode of the three-phase AC voltage source and determine the current value based on the selecting.

In at least one example embodiment, the at least one processor is configured to execute the computer readable instructions to cause the machine drive to determine a second parameter based on the one of the virtual conductance or the virtual resistance and the detected DC bus voltage and control the three-phase AC voltage source based on the second parameter.

In at least one example embodiment, the at least one processor is configured to execute the computer readable instructions to cause the machine drive to generate a charging current command based on the first parameter and the second parameter.

In at least one example embodiment, the at least one processor is configured to execute the computer readable instructions to cause the machine drive to generate a first power command based on the charging current command, generate a second power command based on the first power command and a feed-forward power, determine whether the second power command is within a first saturation limit and a second saturation limit and generate a torque command based on whether the second power command is within the first saturation limit and the second saturation limit.

In at least one example embodiment, the charging current command is a difference between the first parameter and the second parameter.

In at least one example embodiment, the at least one processor is configured to execute the computer readable instructions to cause the machine drive to determine a first set of gains based on a regulator bandwidth, the first set of gains being part of the PI function.

In at least one example embodiment, the at least one processor is configured to execute the computer readable instructions to cause the machine drive to determine the one of the virtual conductance or the virtual resistance based on the first set of gains.

FIG. 1 is a block diagram of a system for controlling an electrical system, according to an example embodiment.

As shown in FIG. 1, a system 100 includes a generator drive 105 and a traction drive 155. The generator drive 105 includes a generator 110 (a three-phrase voltage source), an inverter 115 and a processing system 120. The generator 110 is connected to the inverter 115. In the example of FIG. 1, the generator 110 is an interior permanent magnet (IPM) machine. However, example embodiments are not limited thereto. The processing system 120 controls the generator 110 and the inverter 115, as will be described in greater detail with respect to FIG. 2.

The traction drive 155 includes a traction device 160, an inverter 165 and a processing system 170. The traction device 160 is connected to an inverter 165. In the example of FIG. 1, the traction device 160 is an interior permanent magnet (IPM) machine. However, example embodiments are not limited thereto. The processing system 170 controls the traction device 160 and the inverter 165, as will be described in greater detail with respect to FIG. 2.

The traction drive 155 is an active load connected to a DC bus 175. It should be understood that the term "DC bus" and "DC link" may be used interchangeably.

The generator drive 105 and traction drive 155 are connected to the same DC bus 175.

The inverter 115 may be configured as an AC-DC converter to convert three-phase AC power (from windings $a_1$, $b_1$ and $c_1$) from the generator 110 into DC power for the DC bus 175.

The inverter 115 is controlled by the generator processing system 120, which may include gate drivers and an analog-to-digital converter (ADC), a processing device coupled electrically to the gate drivers, and a memory coupled electrically to the processing device and having stored therein operating instructions for the processing device.

The inverter 115 includes switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

Each transistor is coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus 175 in a generating mode of the generator 110. In example embodiments, space vector modulation may be used. However, it should be understood, that any known pulse-width-modulation scheme for drive systems may be used. Thus, for the sake of brevity, the pulse-width-modulation scheme will not be described in greater detail.

The traction device 160 may have three phase windings $a_2$, $b_2$ and $c_2$. The inverter 165 is coupled electrically between the traction device 160 and the DC bus 175. The inverter 165 may be configured, for example, as a DC-AC inverter to convert DC power from the DC bus 175 into three-phase AC power for the traction device 160, and vice versa.

As used in this document, switch states indicate whether a properly functioning or unimpaired semiconductor device is active ("on" or "closed") or inactive ("off" or "open"). A failure of a semiconductor device to change states may result in a semiconductor device failing in an open state or a closed state, for example.

The inverter 165 is controlled by the motor processing system 170. The motor processing system 170 may include gate drivers and an analog-to-digital converter (ADC), a processing device coupled electrically to the gate drivers, and a memory coupled electrically to the processing device and having stored therein operating instructions for the processing device.

The processing system 170 may include gate drivers and an analog-to-digital converter (ADC), a processing device coupled electrically to the gate drivers, a memory coupled electrically to the processing device and having stored therein operating instructions for the processing device.

The inverter 165 includes switching semiconductors (e.g., insulated gate bipolar transistors (IGBT) or other power transistors, including but not limited to, a Metal-Oxide Semiconductor Field-Effect Transistor (MOSFET), a Silicon Carbide MOSFET or a Silicon Carbide IGBT).

The transistors of the inverter are coupled electrically to a respective gate driver that is dedicated to that transistor and may provide a low DC voltage (e.g., 24 VDC) to turn on and off that transistor. The gate drivers are under the control of the processing device, which may employ a pulse-width-modulation control scheme to control those gate drivers to supply electric energy on the DC bus 175 in the generating mode of the traction device 160 and remove electric energy from the DC bus 175 in the motoring mode of the traction device 160.

The DC bus 175 may be configured, for example, as a bank of capacitors, but is not limited thereto. In FIG. 1, the DC bus 175 is modeled as an ideal capacitor C with an admittance G in parallel with the capacitor C.

In a back to back dual inverter system such as the system shown in FIG. 1, the DC bus capacitor C has at least two functions. In a steady state, the DC bus capacitor provides a low impedance path for a high frequency ripple current to flow.

In the description below, variables with an asterisk, e.g., $x^*$, denote commanded values.

Figure 2:
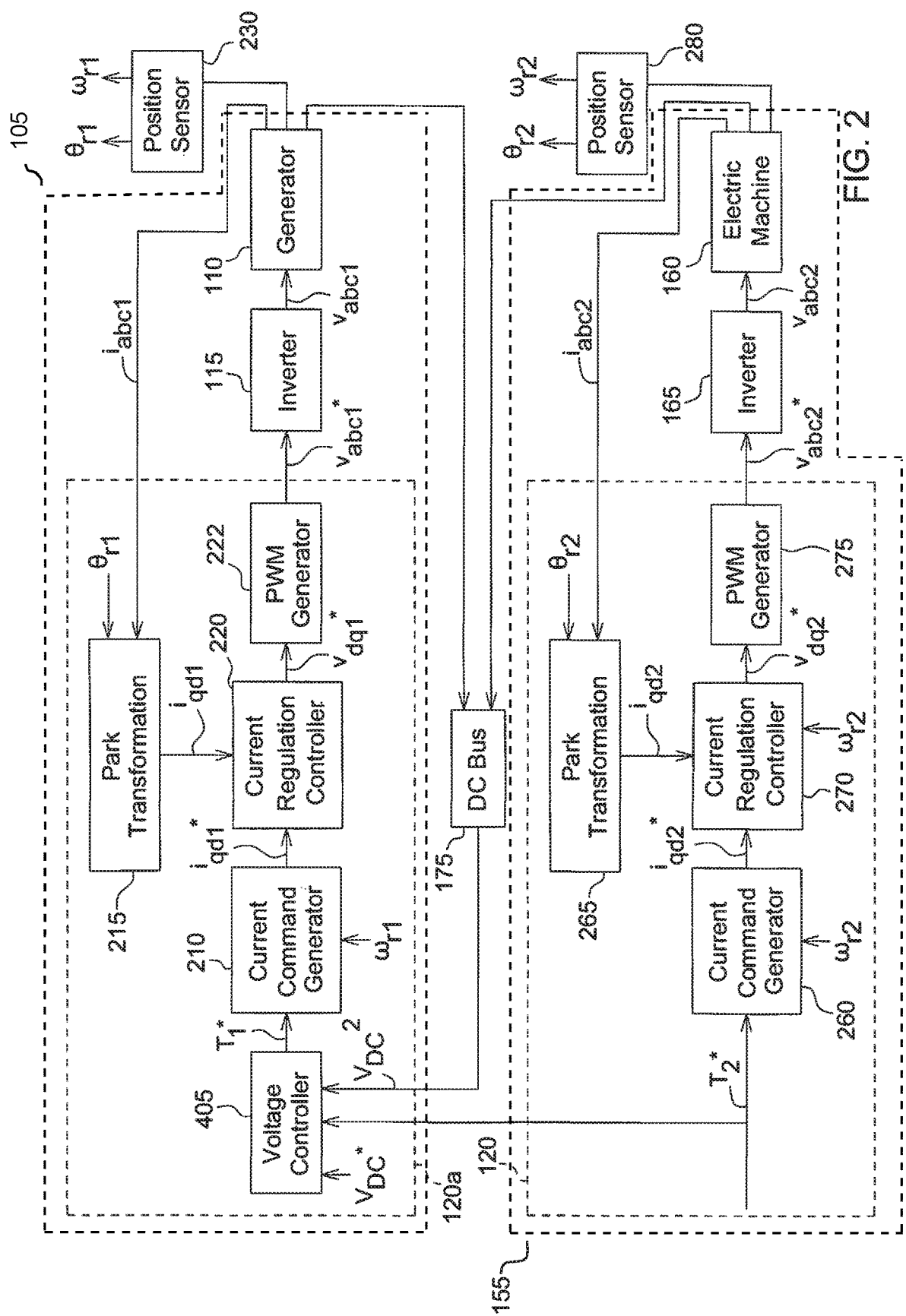

FIG. 2 illustrates a control block diagram of the system 100 of FIG. 1 where the generator operates in a voltage control mode.

A voltage sensor 177 (shown in FIG. 1) measures the DC bus voltage and provides the measured DC bus voltage $v_{DC}$ to the voltage controller 205. The measured DC bus voltage $v_{DC}$ is shown in FIG. 2 without a hat (i.e., $\hat{v}_{dc}$) because the measured quantity is assumed to be equal to the actual physical quantity.

As shown in FIG. 2, the generator drive 105 includes a voltage controller 205, a current command generator 210, a Park transformation module 215, a current regulation controller 220 and a pulse-width modulation (PWM) generator 222. The voltage controller 205, the current command generator 210, the Park transformation module 215, the current regulation controller 220 and the PWM generator 222 may be part of the processing system 120 and may be hardware and/or stored in memory to be executed by a processing device.

The voltage controller 205 receives a DC bus voltage command $v_{DC}^*$ and the measured DC bus voltage $v_{DC}$. The DC bus voltage command $v_{DC}^*$ may be a defined fixed voltage command, for example 700V. In another example embodiment, the DC bus voltage command $v_{DC}^*$ is a varying DC bus voltage command based on specific system applications. The voltage controller 205 performs proportional-integral (PI) control of the DC bus voltage $v_{DC}$, or more precisely, of the capacitor energy. In one example embodiment, the voltage controller 205 outputs a torque command $T_1^*$.

The voltage controller 205 includes an active state feedback and will be described in greater detail below.

Figure 5:
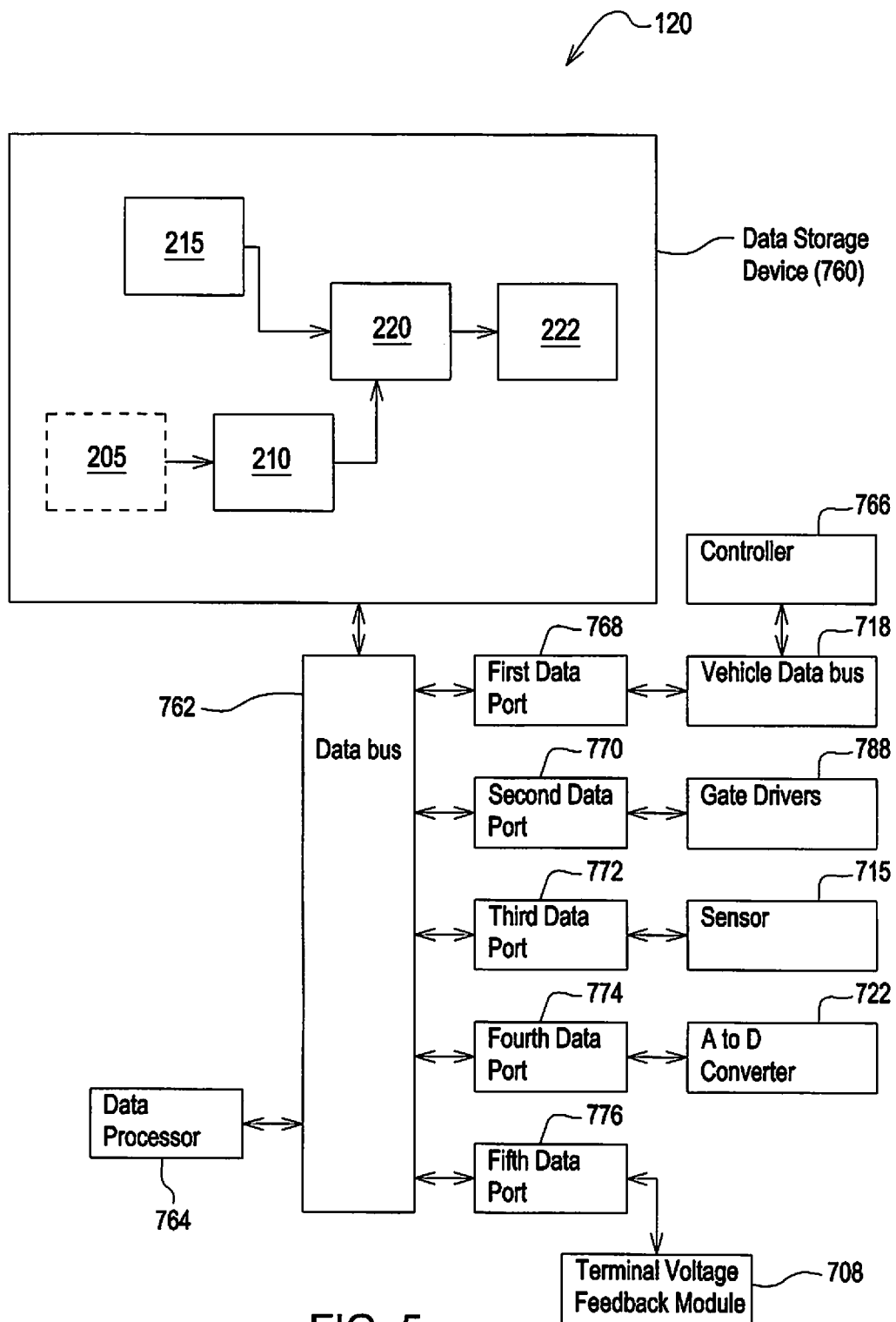

The current command generator 210 may be implemented as a look-up table in hardware and/or stored in memory (e.g., data storage device 760 of FIG. 5). Using the torque command $T_1^*$, the DC bus voltage $v_{DC}$ and a measured electric rotor speed $\omega_{r1}$ of the generator 110, the current command generator 210 generates q-d axis current commands $i_{q1}^*$ and $i_{d1}^*$, using MTPA (maximum torque per amp) and/or MTPV (maximum torque per volt) curves.

It should be understood that the notation of "qd" and "dq" in the subscript refers to both the direct and quadrature currents. In other words, $i_{qd}$ (or $i_{dq}$) represents a vector of $i_q$ and $i_d$. Similar notation is used for "abc", which represents three phases.

During motor characterization, multiple current commands are used at different speed points, which generates the MTPA (maximum torque per amp) and MTPV (maximum torque per volt) curves. Generally, motor characterization is a procedure used to determine d-axis and q-axis commands for a specific speed and $v_{DC}$ condition and torque command. The procedure is repeated at multiple torque commands and multiple speeds. Any known motor characterization procedure may be used.

Referring back to FIG. 2, the Park transformation module 215 (i.e., three-phase to two-phase current Park transformation module) converts respective three-phase digital representations of a measured current into corresponding two-phase digital representations of measured current by performing a Park transformation. More specifically, the Park transformation module 215 transforms a measured three-phase current $i_{abc1}$ to a q-d axis estimated current $i_{qd1}$ using a measured rotor position $\theta_{r1}$ of the generator 110. The Park transformation uses electrical position, which is derived from mechanical rotor position $\theta_{r1}$ and machine pole pairs.

A position sensor 230 generates the estimated/measured rotor position $\theta_{r1}$ from an output of the generator 110. As shown in FIG. 2, the position sensor 230 may be external to the processing system 120 (i.e., the voltage controller 205, the current command generator 210, the Park transformation module 215, the current regulation controller 220 and the PWM generator 222).

More specifically, the sensor 230 (e.g., a resolver, encoder, speed sensor, or another position sensor, speed sensors or algorithm) may determine the estimated/measured rotor position $\theta_{r1}$, the estimated/measured speed of the rotor $\omega_{r1}$, and a direction of rotation of the rotor of the generator 110. The sensor 230 may be mounted on or integral with the rotor of the generator 110. In an example embodiment, the sensor 230 may be coupled to an analog-to-digital converter (not shown) that converts analog raw position data or velocity data to digital raw position or velocity data, respectively. In other example embodiments, the sensor 230 (e.g., digital position encoder) may provide a digital data output of raw position data or velocity data for a shaft or rotor of the generator 110.

The current regulation controller 220 is capable of communicating with a pulse-width modulation (PWM) generation module 222 (e.g., space vector PWM generation module). The current regulation controller 220 receives respective adjusted d-q axis current commands (e.g., $i_{d1}^*$ and $i_{q1}^*$), actual d-q axis currents (e.g., $i_{d1}$ and $i_{q1}$) and the estimated/measured speed of the rotor $\omega_{r1}$ and outputs corresponding d-q axis voltage commands (e.g., $v_{d1}^*$ and $v_{q1}^*$ commands) for input to the PWM generator 222. While the term current command is used, it should be understood that current command refers to a target current value.

In an example embodiment, the PWM generator 222 converts the direct axis voltage and quadrature axis voltage data from two phase data representations into three phase representations (e.g., three phase voltage representations, such as $v_{a1}^*$, $v_{b1}^*$ and $v_{c1}^*$) for control of the generator 110, for example. Outputs of the PWM generator 222 are coupled to the inverter 115.

As described above, the inverter 115 includes power electronics, such as switching semiconductors to generate, modify and control pulse-width modulated signals or other alternating current signals (e.g., pulse, square wave, sinusoidal, or other waveforms) applied to the generator 110. The PWM generator 222 provides inputs to a driver stage within the inverter 115. An output stage of the inverter 115 provides a pulse-width modulated voltage waveform or other voltage signal for control of the generator.

Similar to the generator drive 105, the traction drive 155 includes a current command generator 260, a Park transformation module 265, a current regulation controller 270 and a PWM generator 275. The current command generator 260, the Park transformation module 265, the current regulation controller 270 and the PWM generator 275 may be part of the processing system 170 and are hardware and/or stored in memory.

A sensor 280 operates in the same manner as the sensor 230 to obtain an estimated rotor position $\theta_{r2}$ and estimated rotor speed $\omega_{r2}$ of the traction device 160.

The current command generator 260, the Park transformation module 265, the current regulation controller 270 and the PWM generator 275 perform the same functions as the current command generator 210, the Park transformation module 215, the current regulation controller 220 and the PWM generator 222, respectively. Thus, the same functions apply to the current command generator 260, the Park transformation module 265, the current regulation controller 270 and the PWM generator 275 except measurements, machine parameters and estimates with respect to the traction drive 155 are used (e.g., using the rotor position $\theta_{r2}$ instead of the rotor position $\theta_{r1}$).

Figure 3A:
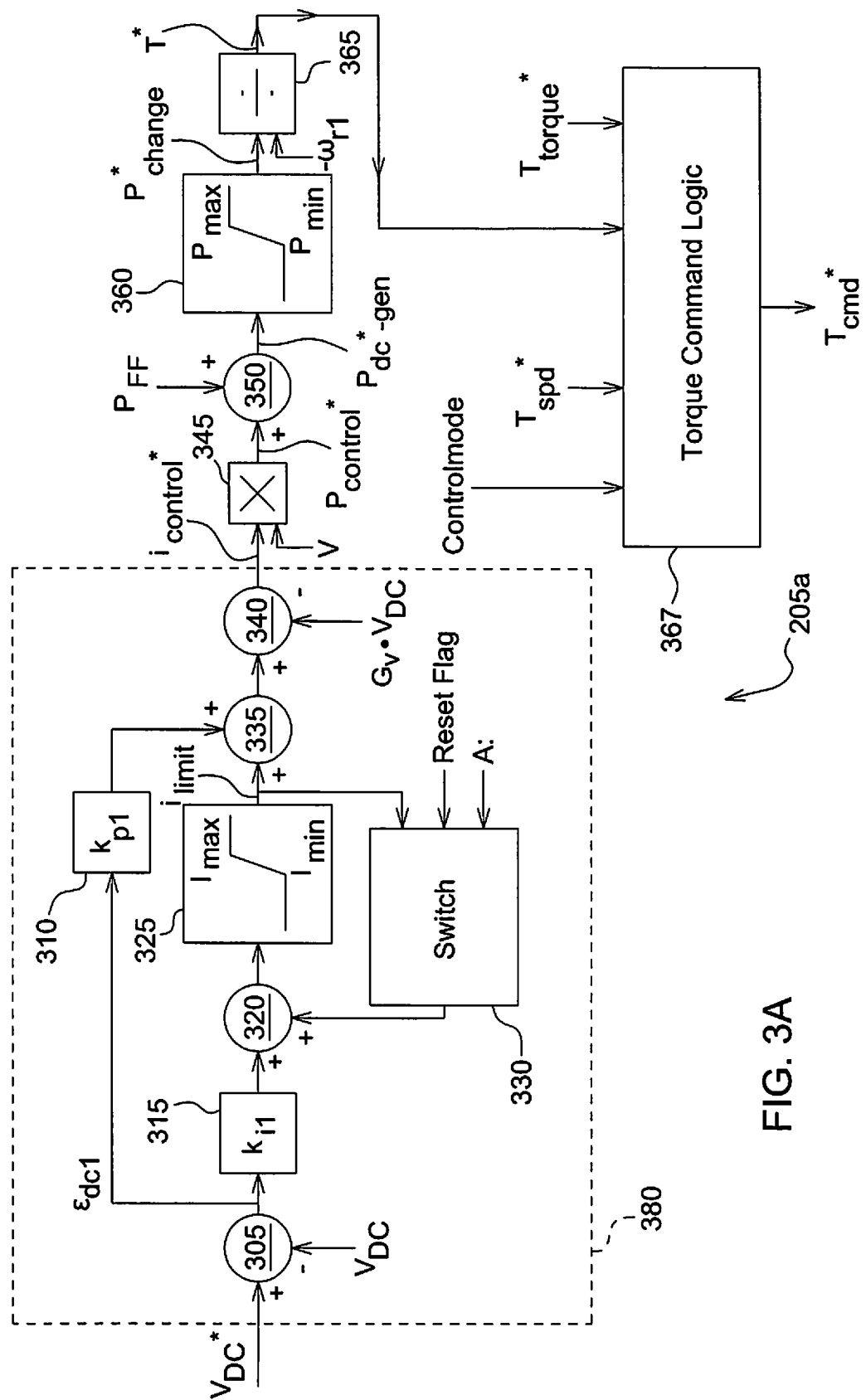
FIG. 3A illustrates an example embodiment of a voltage controller shown in FIG. 2.

FIG. 3A illustrates an example embodiment of the voltage controller 205 operating in a voltage control mode.

As shown in FIG. 3A, a voltage controller 205a includes a first comparator 305, a first amplifier 310, a second amplifier 315, a first adder 320, a current limiter 325, a switch 330, a second adder 335, a second comparator 340, a multiplier 345, a third adder 350, a power limiter 360, a divider 365 and a torque command logic 367.

A PI controller 380 may include the first digital comparator 305, the first amplifier 310, the second amplifier 315, the first adder 320, the current limiter 325, the switch 330, the second adder 335 and the second comparator 340.

The first comparator 305 determines an error $\varepsilon_{DC}$ between the measured DC bus voltage $v_{DC}$ and the DC bus voltage command $v_{DC}^*$. The first and second amplifiers 310 and 315 amplify the error $\varepsilon_{DC}$ by gains $k_{p1}$ and $k_{i1}$, respectively. The output of the first amplifier 310 is input to the second adder 335.

The gains $k_{p1}$ and $k_{i1}$ are determined by the processing system 120 as:

$$k_{p1} = 2\pi^* f_{bw} \cdot C \quad (1)$$

$$k_{i1} = 2\pi^* f_{bw} \cdot G_{v1} \quad (2)$$

where $f_{bw}$ is a bandwidth of the voltage controller 205a in Hz and $G_{v1}$ is a virtual conductance.

The virtual conductance refers to a value included for the purposes of the functions performed by the controller and is not a physical value in the real hardware system. Conductance (G) is the reciprocal of resistance (R) and virtual conductance represents a model of a circuit or device in which the conductance is observed or measured. Accordingly, some of the equations that are set forth herein may be restated or expressed in terms of the reciprocal of equivalent resistance or virtual resistance by substituting the reciprocal of equivalent resistance for the conductance.

The virtual conductance $G_{v1}$ may be determined by the processing system 120 as:

$$G_{v1} = k \cdot k_{p1} \quad (3)$$

where k is a tuned factor based on specific applications and system. In an example embodiment, the tuned factor k is around 1 (within 20 percent of $k_{p1}$). The tuning of the virtual conductance $G_{v1}$ changes the location of the $G_{v1}/C$ pole of the generator 110 closed-loop disturbance rejection function from $i_{dis}$ to $v_{DC}$. If the two poles are too close, resonance issues will occur.

The setting of the gains increases the dynamic stiffness, i.e., the capability to reject the load disturbance.

A load current disturbance rejection function of the drive 105 is:

$$\frac{v_{DC}}{i_{dis}} = \frac{s}{s^2 C + s(G_{v1} + k_{p1}) + k_{i1}} = \frac{s}{s^2 C + s(G_{v1} + 2\pi f_{bw} C) + 2\pi f_{bw} G_{v1}} \quad (4)$$

where $i_{dis}$ is a current disturbance (i.e., physical disturbance caused by behavior of the electric machine 160 (e.g., traction motor)).

The current disturbance $i_{dis}$ is part of a physical system modeling and represents any load changes (i.e., between a feed-forward power $P_{ff}$ and a total current consumption from the DC bus 175).

In a closed loop voltage control system, disturbance rejection capability is desired. Conventionally, bandwidth had to be increased for the voltage controller to suppress load disturbance. However, increasing the bandwidth amplifies the feedback noise. Moreover, increasing bandwidth of a closed-loop tracking system deteriorates the stability margin. Example embodiments improve disturbance rejection without increasing the close-loop system bandwidth. By not increasing the bandwidth, the system stability is not deteriorated and does not amplify the feedback noise.

An output of the second amplifier 315 input to the first adder 320, which adds the output of the second amplifier 315 to an output of the switch 330 The output of adder 320 is an integrator output in Amperes. The current limiter 325 limits the output of the first adder 320 to a range between a maximum current $i_{max}$ and a minimum current $i_{min}$, including the maximum current $i_{max}$ and the minimum current $i_{min}$. The limits of the current limiter 325 are determined by the processing system 120 as:

$$i_{max} = ((P_{max} \cdot \eta_{max})/v_{DC}) + v_{DC} \cdot G_{v1} \quad (5)$$

$$i_{min} = ((P_{min} \cdot \eta_{min})/v_{DC}) + v_{DC} \cdot G_{v1} \quad (6)$$

where $\eta_{max}$ and $\eta_{min}$ are maximum and minimum coefficients, respectively, $G_{v1}$ is a virtual conductance and $P_{max}$ and $P_{min}$ are maximum and minimum power limits that are determined as follows:

$$P_{max} = Plim\_B \quad (7)$$

$$P_{min} = Plim\_M \quad (8)$$

where Plim_B and Plim_M is the generator braking power capability in Watts of the generator 110, and motoring power capability in Watts of the generator 110, respectively, where $$Plim\_B = Tlim\_B * \omega_{r1} \quad (9)$$

$$Plim\_M = Tlim\_M * \omega_{r1} \quad (10)$$

where Tlim_B and Tlim_M are the braking and motoring torque limit of generator 110. The braking torque limit Tlim_B and the motoring torque limit TLim_M are based on system specific factors such as electromagnetic characteristics, a winding temperature of the generator 110, the inverter 115, DC bus voltage $v_{DC}$, the speed of generator 110 $\omega_{r1}$, a controller area network (CAN) bus torque limit, and a user defined torque limit for generator 110.

More specifically, for the braking mode, torque limits are determined for each of a CAN bus, speed based derating, DC bus voltage derating, machine torque speed curve, machine winding temperature derating and power (e.g., IGBT) temperature derating, respectively. The braking torque limit Tlim_B is a minimum of the torque limits.

Similarly, for the motoring mode, torque limits are determined for each of a CAN bus, speed based derating, DC bus voltage derating, machine torque speed curve, machine winding temperature derating and power (e.g., IGBT) temperature derating, respectively. The motoring torque limit Tlim_M is a minimum of the torque limits determined for the motoring mode.

Marginal factors $\eta_{max}$ and $\eta_{min}$ are maximum and minimum coefficients that are used to compensate for losses that occur in the system 100, and the inaccuracy of feedforward term $P_{ff}$ (e.g., from a shaft torque command multiplied by a loading machine speed). The coefficients $\eta_{max}$ and $\eta_{min}$ are set on a system-by-system basis based on empirical data.

If the output of the first adder 320 is between the maximum current $i_{max}$ and a minimum current $i_{min}$, the current limiter 325 outputs the output of the first adder 320 as a current $i_{limit}$. If the output of the first adder 320 is equal to or higher than the maximum current $i_{max}$, the current limiter 325 outputs the maximum current $i_{max}$ as the current $i_{limit}$. If the output of the first adder 320 is less than or equal to the minimum current $i_{min}$, the current limiter 325 outputs the minimum current $i_{min}$ as the current $i_{limit}$.

The switch 330 outputs one of the current $i_{limit}$ and an integrator reset value A to the first adder 320 based on a reset flag. The processing system 120 may determine the integrator reset value A as:

$$A = ((-T_{cmd}^* \cdot \omega_{r1} - P_{FF})/v_{DC}) + v_{DC} \cdot G_{v1} \quad (11)$$

where $P_{FF}$ is the feed-forward power, $T_{cmd}^*$ is a generator drive torque command of the generator 110 and $\omega_{r1}$ is a rotor speed of the generator 110. Based on the control mode, the generator torque command $T_{cmd}^*$ can be one of the torque command $T_1^*$ (for voltage control mode) for the generator 110, a speed control torque command $T_{spd}^*$ (for speed control mode) for the generator 110 and a torque control torque command $T_{torque}^*$ (for torque control mode) for the generator 110.

The reset flag is decided by whether the inverter 115 is in a voltage control mode and whether the drive is enabled. The reset flag is zero when the drive is enabled and in voltage control mode (as opposed to a torque control mode). Otherwise, the reset flag is one. When the reset flag is one, the switch 330 outputs the integrator reset value A.

In the voltage control mode, the generator 110 controls the voltage supply to the DC bus 175.

The adder 335 adds the current $i_{limit}$ and the output of the first amplifier 310. The second comparator 340 determines a difference between the sum of the current $i_{limit}$ and the output of the first amplifier 310 and an active state feedback $v_{DC} \cdot G_{v1}$. As will be shown in FIG. 3B, the active state feedback $v_{DC} \cdot G_{v1}$ is part of an inner feedback loop. The active state feedback improves the dynamic stiffness of the drive 105 and the stability of the drive 105.

The difference between the sum of the current $i_{limit}$ and the output of the first amplifier 310 and $v_{DC} \cdot G_{v1}$ is a (i.e., the DC bus capacitor C) current command $i_{control}*$. The current command $i_{control}*$ is part of a current command $i_{DC\_gen}*$ for the generator 110. The current command $i_{DC\_gen}*$ is composed by two parts: one part is from a feed-forward current $i_{ff}$ (feed-forward load current), and the second part is from the controller 380 (i.e. the current command $i_{control}*$). In the situation without a feed-forward term, the current command $i_{DC\_gen}*$ for the generator 110 is all contributed by the controller current command $i_{control}*$.

The multiplier 345 multiplies the current command $i_{control}*$ with the DC bus voltage $v_{DC}$ to generate a DC bus power control command $P_{control}*$. The DC bus power control command $P_{control}*$ is the generator power calculated by the controller 380. The third adder 350 adds the DC bus power control $P_{control}$ with the feed-forward power $P_{ff}$ to generate a summed power command $P_{DC\_gen}*$. The summed power command $P_{DC\_gen}*$ is a command for a power to be contributed by the generator 110 to the DC bus 175. The feed-forward power $P_{ff}$ may be determined by the processing system 120 as follows:

$$P_{ff}=T_2*\cdot \omega_{r2} \tag{12}$$

The power limiter 360 limits the summed power $P_{sum}$ to a range between the maximum power $P_{max}$ and the minimum power $P_{min}$, including the maximum power $P_{max}$ and the minimum power $P_{min}$. If the summed power $P_{sum}$ is between the maximum power $P_{max}$ and a minimum power $P_{min}$, the power limiter 360 outputs the summed power $P_{sum}$ as a power command $P_{charge}*$. If the summed power $P_{sum}$ is equal to or higher than the maximum power $P_{max}$, the power limiter 360 outputs the maximum power $P_{max}$ as the power command $P_{charge}*$. If the summed power $P_{sum}$ is less than or equal to the minimum power $P_{min}$, the power limiter 360 outputs the minimum power $P_{min}$ as the power command $P_{charge}*$.

The divider 365 divides the power $P_{charge}$ by the negative rotor speed $-\omega_{r1}$ to generate the torque command $T_1*$ for voltage control mode (i.e., $T_1*=P_{charge}*/-\omega_{r1}$). The torque command logic 367 selects the one of the torque command $T_1*$ (for voltage control mode), the speed control torque command $T_{spd}*$ (for speed control mode) and the torque control torque command $T_{torque}*$ (for torque control mode) for the corresponding control mode.

Figure 3B:
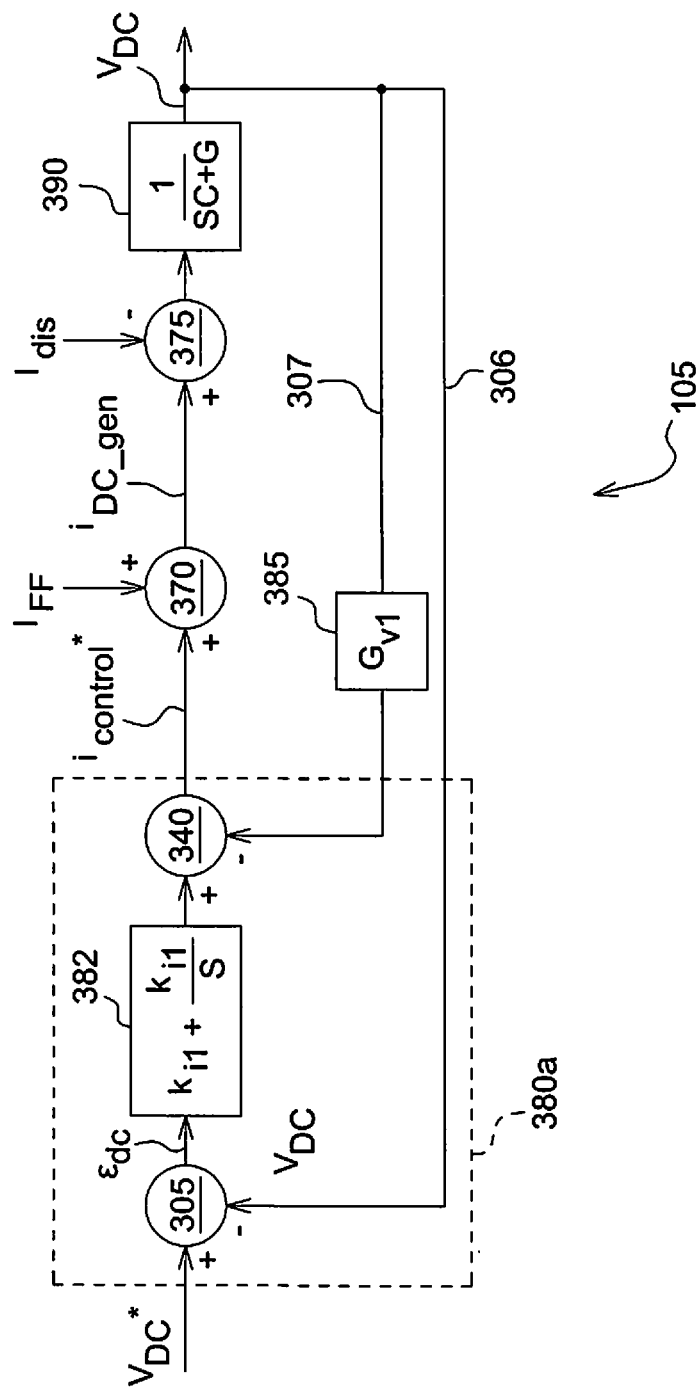
FIG. 3B is a high-level illustration of a generator drive shown in FIG. 1.

FIG. 3B is a high-level illustration of the generator drive 105.

As shown in FIG. 3B, a generator drive 105 includes a PI controller 380a. The PI controller 380a may be the same as the PI controller 380. As shown in FIG. 3B, the PI controller 380a includes the first digital comparator 305, a first amplifier 382 and the second comparator 340. The generator drive 105 further includes a first adder 370, a third comparator 375, a second amplifier and a DC bus amplifier 390.

The first comparator 305 determines the error $\varepsilon_{DC}$ between the measured DC bus voltage $v_{DC}$ and the DC bus voltage command $v_{DC}*$. The measured DC bus voltage $v_{DC}$ is part of an outer feedback loop 306 of the generator drive 105. The first amplifier 382 amplifies the error $\varepsilon_{DC}$ by $(k_{p1}+(k_{i1}/s))$. The output of the first amplifier 382 is input to the second comparator 340.

The second comparator 340 determines a difference between the output of the amplifier 382 and the active state feedback $v_{DC}\cdot G_{v1}$. The active state feedback $v_{DC}\cdot G_{v1}$ is part of an inner feedback loop 307 relative to the outer feedback loop 306. The inner feedback loop 307 is a feedback from the DC bus voltage $v_{DC}$ to the comparator 340 with the amplifier 385 on the inner feedback loop 307. The active state feedback $v_{DC}\cdot G_{v1}$ improves the dynamic stiffness of the drive 105 and the stability of the drive 105.

The difference between the output of the amplifier 382 and the active state feedback $v_{DC}\cdot G_{v1}$ is the current command $i_{control}*$ from the controller 380a. The first adder 370 sums the current command $i_{control}*$ and a feed-forward current $i_{ff}$ to generate a current command $i_{DC\_gen}*$. The current command $i_{DC\_gen}*$ is a command for a current to be contributed by the generator 110 to the DC bus 175. The feed-forward current $i_{ff}$ is the estimated total DC bus load current used for feed-forward control, where $$i_{ff}=P_{ff}/v_{DC} \tag{13}$$

The third comparator 375 compares a difference between the current command $i_{DC\_gen}*$ and the current disturbance $i_{dis}$. The current disturbance $i_{dis}$ is part of the physical system modeling and represents any load disturbance (i.e., between a feed-forward current $i_{ff}$ and a total current consumption from the DC bus 175).

A provided above, the disturbance rejection function of the drive 105 is:

$$\frac{v_{DC}}{i_{dis}}=\frac{s}{s^2C+s(G_{v1}+k_{p1})+k_{i1}}=\frac{s}{s^2C+s(G_{v1}+2\pi f_{bw}C)+2\pi f_{bw}G_{v1}} \tag{14}$$

The setting of the gains $k_{p1}$ and $k_{i1}$ increases the dynamic stiffness, i.e., the capability to reject the disturbance, which means that the system has improved stable DC bus voltage regulation) when the load (i.e., electric machine 160) changes.

The output of the third comparator 375 is the current that flows through the DC bus capacitor C. The amplifier 390 is a Laplace domain mathematical representation of the DC bus capacitor C and the associated conductance G.

More specifically, the output of the third comparator 375 is amplified by the amplifier 390 by $$\frac{1}{SC+G}$$

to generate the DC bus voltage $v_{DC}$, where G is a real part of the conductance. The DC bus voltage $v_{DC}$ is feedback to the first comparator 305 and the second amplifier 385.

Figure 4A:
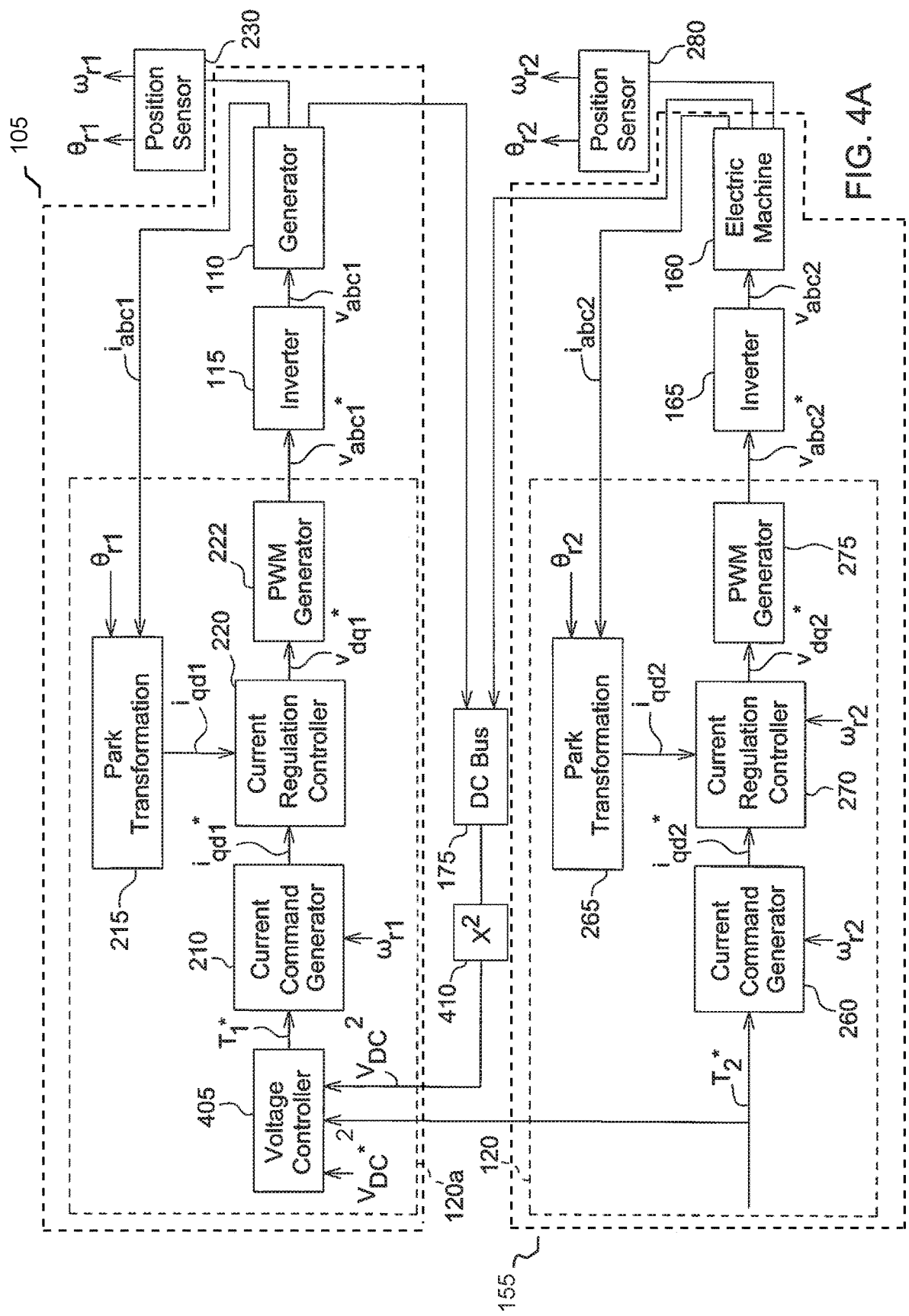
FIG. 4A illustrates another control block diagram of the system in FIG. 1, according to an example embodiment.

FIG. 4A illustrates another control block diagram of the system in FIG. 1 according to an example embodiment.

As shown in FIG. 4A, the processing system 120a differs from the processing system 120 (shown in FIG. 2) in that the voltage controller 405 determines a difference between a squared measured DC bus voltage $v_{DC}^2$ and a squared DC bus voltage command $v_{DC}*^2$. As shown, the measured DC bus voltage $v_{DC}$ is squared at 410 and then input to the voltage controller 405. Moreover, the processing system 120a outputs a power command $p_{control}*$ as opposed to the current command $i_{control}*$.

Figure 4B:
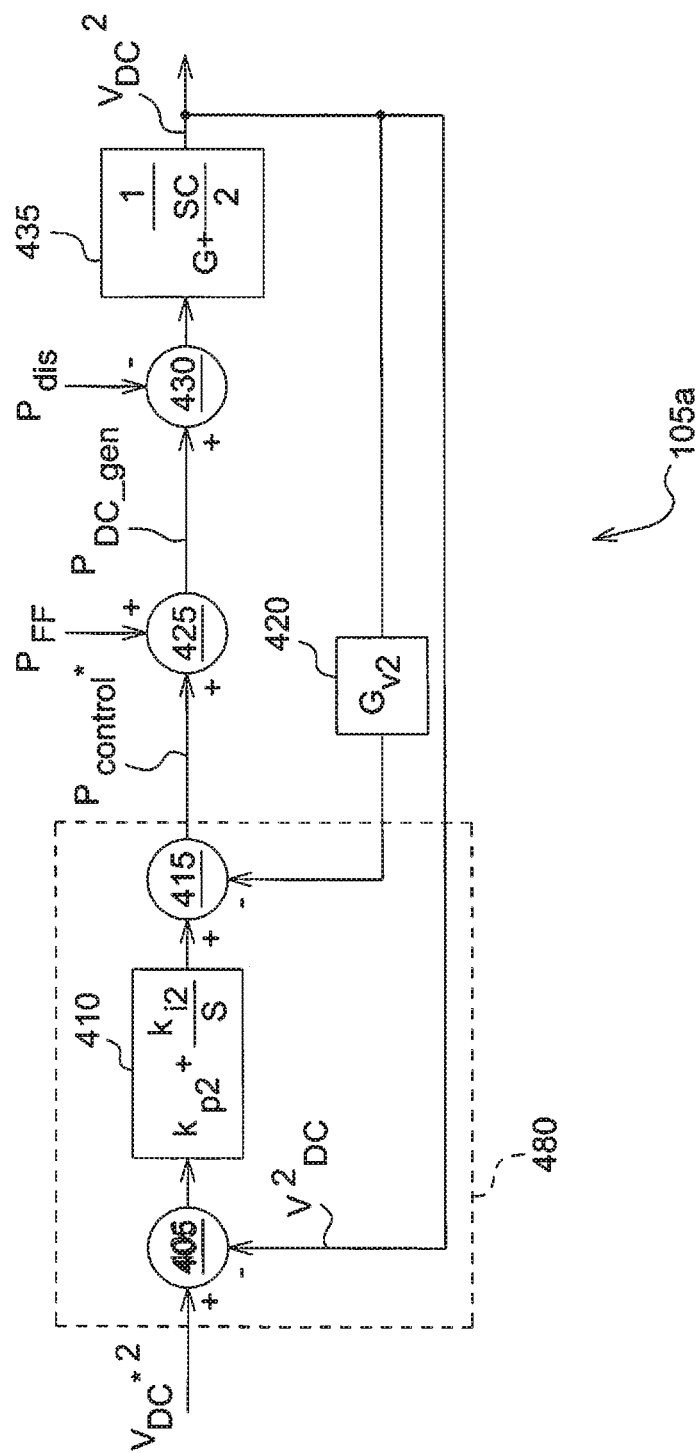
FIG. 4B is a high-level illustration of the generator drive shown in FIG. 1.

FIG. 4B is a high-level illustration of the generator drive shown in FIG. 1 including the voltage controller 405 shown in FIG. 4A.

As shown in FIG. 4B, a generator drive 105a includes a first comparator 406, a first amplifier 410, a second comparator 415, a second amplifier 420, a first adder 425, a third comparator 430 and a third amplifier 435.

A PI controller 480 may include the first digital comparator 406, the first amplifier 410 and the second comparator 415.

The first comparator 406 determines an error $\varepsilon_{DC}^2$ between the squared measured DC bus voltage $v_{DC}^2$ and the squared DC bus voltage command $v_{DC}^{*2}$. The first amplifier 410 amplifies the error $\varepsilon_{DC}^2$ by $(k_{p2}+(k_{i2}/s))$. The output of the first amplifier 310 is input to the second comparator 415.

The gains $k_{p2}$ and $k_{i2}$ are determined by the processing system 120 as:

$$k_{p2}=2\pi \cdot f_{bw}^* \cdot (C/2) \tag{15}$$

$$k_{i2}=2\pi^* f_{bw} \cdot G_{v2} \tag{16}$$

where $f_{bw}$ is a bandwidth of the voltage controller 405 in Hz and $G_{v2}$ is a virtual conductance.

The virtual conductance $G_{v2}$ may be determined by the processing system 120 as:

$$G_{v2}=k \cdot k_{p2} \tag{17}$$

where k is a tuned factor based on specific applications and system. In an example embodiment, the tuned factor k is between 0 and 1.

The second comparator 415 determines a difference between the output of the amplifier 410 and an active state feedback $v_{DC}^2 \cdot G_{v2}$. The active state feedback $v_{DC}^2 \cdot G_{v2}$ improves the dynamic stiffness of the drive 105a and the stability of the drive 105a.

The difference between the output of the amplifier 410 and the active state feedback $v_{DC}^2 \cdot G_{v2}$ is a charging (i.e., for the DC bus capacitor C) power command $P_{control}^*$.

The charging power command $P_{control}^*$ is part of a power command $P_{DC\_gen}^*$ for the generator 110. The power command $P_{DC\_gen}^*$ is composed by two parts: one part is from a feed-forward power $P_{ff}$ (feed-forward load power), and the second part is from the controller 480 (i.e. the charging power command $P_{control}^*$). In a situation without a feed-forward term, the power command $P_{DC\_gen}^*$ for the generator 110 is all contributed by the charging power command $P_{control}^*$.

The first adder 425 sums the charging power command $P_{control}^*$ and the feed-forward power $P_{FF}$ to generate the power command $P_{DC\_gen}^*$. The torque command $T_1^*$ is obtained by dividing charging power command $P_{control}^*$ by negative rotor speed $-\omega_{r1}$. The torque command $T_1^*$ in voltage control mode (i.e., DC bus voltage control) is calculated as:

$$T_1^*=P_{DC\_gen}^*/(-\omega_{r1}) \tag{18}$$

The third comparator 430 compares a difference between the power command $P_{DC\_gen}^*$ and the power disturbance $P_{dis}$.

The disturbance rejection function of the drive 105a is:

$$\frac{v_{dc}^2}{P_{dis}} = \frac{s}{s^2\left(\frac{C}{2}\right) + s(G_{v2}+k_{p2}) + k_{i2}} \tag{19}$$

The setting of the gains $k_{p2}$ and $k_{i2}$ improves the system's load disturbance capability, which means that the system has improved stable DC bus voltage regulation) when the load (i.e., electric machine 160) changes.

The difference between an output of the first adder 425 and the power disturbance $P_{dis}$ is amplified by the third amplifier 435 by $(1/(s \cdot C/2+G))$ to generate the squared DC bus voltage $v_{DC}^2$. The squared DC bus voltage $v_{DC}^2$ is feedback to the first comparator 405 and the second amplifier 420.

FIG. 5 is a block diagram of an electronic data processing system consistent with the processing system 120, according to an example embodiment. While only the processing system 120 is illustrated, it should be understood that the processing system 170 has the same structure. In another example embodiment, the processing system 170 does not have a voltage controller if the processing system 170 obtains a direct torque command instead of a voltage command.

Thus, in FIG. 5, it should be noted the voltage controller 205 is illustrated in dashed lines because the processing system 170 does not utilize the voltage controller 205.

In FIG. 5, the electronic data processing system 120 includes an electronic data processor 764, a data bus 762, a data storage device 760, and one or more data ports (768, 770, 772, 774 and 776). The data processor 764, the data storage device 760 and one or more data ports are coupled to the data bus 762 to support communications of data between or among the data processor 764, the data storage device 760 and one or more data ports. The data processor 764 is configured to execute computer-readable instructions stored in the data storage device 760 to perform the functions described above with respect to FIGS. 1-4B. Moreover, while some components are illustrated as being part of the data storage device 760, it should be understood that some components may be just hardware and/or a combination of hardware and software. For example, the PWM generator 222 may be considered hardware and software. In this example, the data processor 764 is configured to execute the computer-readable instructions to control the hardware portion of the PWM generator 222 and the inverter 115.

In an example embodiment, the data processor 764 may include an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device.

As shown in FIG. 5, the data ports include a first data port 768, a second data port 770, a third data port 772, a fourth data port 774 and a fifth data port 776. While in FIG. 7, 5 data ports are shown, any suitable number of data ports may be used. Each data port may include a transceiver and buffer memory, for example. In an example embodiment, each data port may include any serial or parallel input/output port.

In an example embodiment as illustrated in FIG. 5, the first data port 768 is coupled to a vehicle data bus 718. In turn, the vehicle data bus 718 is coupled to a controller 766. In one configuration, the second data port 770 may be coupled to the gate drivers 788 (e.g., connected to one of inverter 115); the third data port 772 may be coupled to an external sensor 715 (e.g., the sensor 230); the fourth data port 774 may be coupled to an analog-to-digital converter 722; and the fifth data port 776 may be coupled to a terminal voltage feedback module 708. The analog-to-digital converter 722 may be coupled to the sensor and convert analog measurements into digital values.

In an example embodiment of the data processing system 120, a controller 766 is associated with or supported by the first data port 768 of the electronic data processing system 120. The first data port 768 may be coupled to a vehicle data bus 718, such as a controller area network (CAN) data bus. The vehicle data bus 718 may provide data bus messages with torque commands to the controller 766 via the first data port 768. The operator of a vehicle may generate the torque commands via a user interface, such as a throttle, a pedal, or other control devices.

The data processor 764 may communicate with the gate drivers 788, the sensor 715, the analog-to-digital converter 722, the terminal voltage feedback module 708 and the vehicle data bus 718 over the data bus 762.

Figure 6:
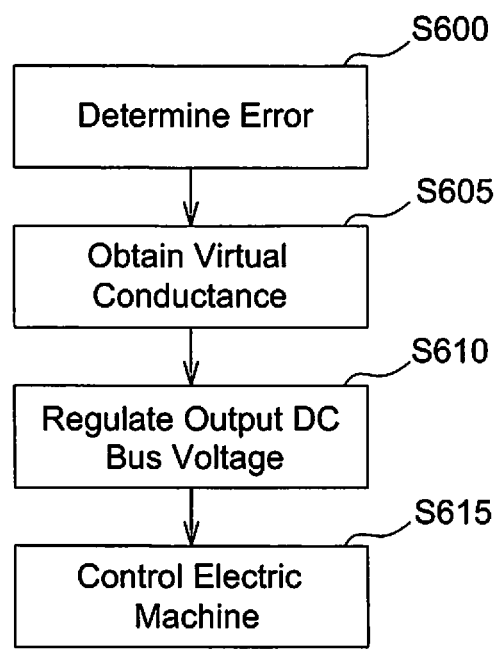

FIG. 6 illustrates a method of controlling an electric machine (e.g., the generator 110). The method of FIG. 6 may be performed by a processing system such as the processing system 120 or the processing system 170.

At S600, the processing system determines an error between a DC bus voltage command and a detected DC bus voltage. The detected DC bus voltage is part of an outer feedback loop. For example, the first comparator 305 determines the error $\varepsilon_{DC}$ between the measured DC bus voltage $v_{DC}$ and the DC bus voltage command $v_{DC}^*$.

At S605, the processing system obtains a virtual conductance. The virtual conductance is part of an inner feedback loop relative to the outer feedback loop. For example, the virtual conductance $G_{v1}$ is applied by the processing system 120 to the measured DC bus voltage $v_{DC}$.

At 610, the processing system 120 regulates an output DC bus voltage based on the error and the virtual conductance. For example, the processing system 120 uses an active state feedback improves the dynamic stiffness of the drive 105 and the stability of the drive 105.

At S615, the processing system controls the electric machine based on the output DC bus voltage.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of controlling a three-phase alternating current (AC) voltage source, the method comprising:
   determining an error between a direct current (DC) bus voltage command and a detected DC bus voltage, the detected DC bus voltage being a part of an outer feedback loop;
   obtaining one of a conductance value or a resistance value, the one of the conductance value or the resistance value being a part of an inner feedback loop relative to the outer feedback loop;
   regulating an output DC bus voltage based on the error and the one of the conductance value or the resistance value;
   controlling the three-phase AC voltage source based on the regulation of the output DC bus voltage;
   generating a first parameter based on a proportional integral (PI) function and the error;
   determining a second parameter based on the one of the conductance value or the resistance value and the detected DC bus voltage, wherein the controlling controls the three-phase AC voltage source based on the first parameter and the second parameter; and
   generating a charging current command based on a difference between the first parameter and the second parameter.

2. The method of claim 1, wherein the generating the first parameter includes,
   determining a current value based on the error,
   determining whether the current value is within a first saturation limit and a second saturation limit, and
   generating the first parameter based on whether the current value is within the first saturation limit and the second saturation limit.

3. The method of claim 2, wherein the determining the current value includes,
   selecting one of a limited current value and a reset value based on an operating mode of the three-phase AC voltage source, and
   determining the current value based on the selecting.

4. The method of claim 1, further comprising:
   generating a first power command based on the charging current command;
   generating a second power command based on the first power command and a feed-forward power;
   determining whether the second power command is within a first saturation limit and a second saturation limit; and
   generating a torque command based on whether the second power command is within the first saturation limit and the second saturation limit.

5. The method of claim 1, further comprising:
   determining a first set of gains based on a regulator bandwidth, the first set of gains being part of the PI function.

6. The method of claim 5, further comprising:
   determining the one of the conductance value or the resistance value based on the first set of gains.

7. A machine drive comprising:
   a three-phase alternating current (AC) voltage source;
   a memory storing computer readable instructions; and
   at least one processor configured to execute the computer readable instructions to cause the machine drive to,
      determine an error between a direct current (DC) bus voltage command and a detected DC bus voltage, the detected DC bus voltage being a part of an outer feedback loop,
      obtain one of a conductance value or a resistance value, the one of the conductance value or the resistance value being a part of an inner feedback loop relative to the outer feedback loop,
      regulate an output DC bus voltage based on the error and the one of the conductance value or the resistance value,
      control the three-phase AC voltage source based on the regulation of the output DC bus voltage,
      generate a first parameter based on a proportional integral (PI) function and the error,
      determine a second parameter based on the one of the conductance value or the resistance value and the detected DC bus voltage, wherein the controlling controls the three-phase AC voltage source based on the first parameter and the second parameter, and
      generate a charging current command based on a difference between the first parameter and the second parameter.

8. The machine drive of claim 7, wherein the at least one processor is configured to execute the computer readable instructions to cause the machine drive to,
   determine a current value based on the error,
   determine whether the current value is within a first saturation limit and a second saturation limit, and
   generate the first parameter based on whether the current value is within the first saturation limit and the second saturation limit.

9. The machine drive of claim 8, wherein the at least one processor is configured to execute the computer readable instructions to cause the machine drive to, select one of a limited current value and a reset value based on an operating mode of the three-phase AC voltage source, and determine the current value based on the selecting.

10. The machine drive of claim 7, wherein the at least one processor is configured to execute the computer readable instructions to cause the machine drive to, generate a first power command based on the charging current command;

generate a second power command based on the first power command and a feed-forward power;

determine whether the second power command is within a first saturation limit and a second saturation limit; and generate a torque command based on whether the second power command is within the first saturation limit and the second saturation limit.

11. The machine drive of claim 7, wherein the at least one processor is configured to execute the computer readable instructions to cause the machine drive to, determine a first set of gains based on a regulator bandwidth, the first set of gains being part of the PI function.

12. The machine drive of claim 11, wherein the at least one processor is configured to execute the computer readable instructions to cause the machine drive to, determine the one of the conductance value or the resistance value based on the first set of gains.

* * * * *